United States Patent
Oliva Llena et al.

(10) Patent No.: US 9,841,243 B2
(45) Date of Patent: Dec. 12, 2017

(54) THERMAL ENERGY STORAGE SYSTEM COMBINING SENSIBLE HEAT SOLID MATERIAL AND PHASE CHANGE MATERIAL

(71) Applicant: UNIVERSITAT POLITÉCNICA DE CATALUNYA, Barcelona (ES)

(72) Inventors: Asensi Oliva Llena, Barcelona (ES); Carlos David Pérez Segarra, Barcelona (ES); Joaquim Rigola Serrano, Barcelona (ES); Jesús Castro González, Barcelona (ES); Carles Oliet Casasayas, Barcelona (ES); Ivette Rodríguez Pérez, Barcelona (ES); Oriol Lehmkuhl Barba, Barcelona (ES); Xavi Trias Miquel, Barcelona (ES); Roser Capdevila Paramio, Barcelona (ES); Ramiro Alba Queipo, Barcelona (ES); Manuel Miguel Ordoño Martínez, Barcelona (ES); Pedro Andrés Galione Klot, Barcelona (ES)

(73) Assignee: Universitat Politècnica de Catalunya, Barcelona (ES)

( * ) Notice: Subject to any disclaimer, the term of this patent is extended or adjusted under 35 U.S.C. 154(b) by 172 days.

(21) Appl. No.: 14/655,722

(22) PCT Filed: Dec. 18, 2013

(86) PCT No.: PCT/ES2013/070889
§ 371 (c)(1),
(2) Date: Jun. 26, 2015

(87) PCT Pub. No.: WO2014/102418
PCT Pub. Date: Jul. 3, 2014

(65) Prior Publication Data
US 2016/0201995 A1 Jul. 14, 2016

(30) Foreign Application Priority Data

Dec. 27, 2012 (ES) .................................. 201232038

(51) Int. Cl.
*F28D 17/00* (2006.01)
*F28D 20/02* (2006.01)
(Continued)

(52) U.S. Cl.
CPC ....... *F28D 20/026* (2013.01); *F28D 20/0056* (2013.01); *F28D 20/023* (2013.01);
(Continued)

(58) Field of Classification Search
CPC ................. F28D 20/026; F28D 20/023; F28D 2020/006; F28D 2020/0065; F28D 2020/0086; F28F 21/04
(Continued)

(56) References Cited

U.S. PATENT DOCUMENTS

| 4,523,629 A | 6/1985 | Copeland |
| 2010/0230075 A1 | 9/2010 | Mathur et al. |

(Continued)

FOREIGN PATENT DOCUMENTS

| EP | 2141432 | 6/2010 |
| JP | S5610695 A | 2/1981 |

(Continued)

*Primary Examiner* — Davis Hwu
(74) *Attorney, Agent, or Firm* — Robert J. Hess; Hess Patent Law Firm

(57) ABSTRACT

The invention relates to a system for the storage and recovery of thermal energy, using, as its medium, at least one phase change material (solid-liquid) and a sensible heat solid material for storing/recovering the heat obtained from an external source in the form of phase change latent heat and sensible heat. The aforementioned materials are duly housed inside a single tank containing at least two zones which are (Continued)

differentiated by the range of temperatures to which they are subjected, each zone containing a different material. The most common configuration consists of three different zones located inside the tank, namely: a hot zone in the upper part of the tank, enclosing an encapsulated phase change material characterized by a high melting temperature; a cold zone housed in the lower part of the tank, containing a phase change material with a low melting temperature; and a middle zone containing a sensible heat solid material.

10 Claims, 5 Drawing Sheets

(51) Int. Cl.
*F28D 20/00* (2006.01)
*F28F 21/04* (2006.01)

(52) U.S. Cl.
CPC ........ *F28F 21/04* (2013.01); *F28D 2020/006* (2013.01); *F28D 2020/0065* (2013.01); *F28D 2020/0086* (2013.01); *Y02E 60/142* (2013.01); *Y02E 60/145* (2013.01)

(58) Field of Classification Search
USPC ........................................................... 165/10
See application file for complete search history.

(56) References Cited

U.S. PATENT DOCUMENTS

| | | |
|---|---|---|
| 2010/0301062 A1 | 12/2010 | Litwin |
| 2011/0016858 A1 | 1/2011 | Gaiser |
| 2011/0259544 A1 | 10/2011 | Neti |
| 2012/0018116 A1 | 1/2012 | Mathur et al. |
| 2012/0055661 A1 | 3/2012 | Feher |
| 2012/0104003 A1 | 5/2012 | Lee |
| 2012/0118554 A1 | 5/2012 | Mathur et al. |
| 2012/0227926 A1* | 9/2012 | Field ................... F24D 11/003 165/10 |
| 2013/0189594 A1* | 7/2013 | Breit ................ H01M 8/04052 429/410 |

FOREIGN PATENT DOCUMENTS

| | | |
|---|---|---|
| JP | S5610696 A | 2/1981 |
| JP | 2011144961 A | 7/2011 |
| WO | WO 2014/102418 A1 | 7/2014 |

* cited by examiner

THERMAL ENERGY STORAGE SYSTEM COMBINING SENSIBLE HEAT SOLID MATERIAL AND PHASE CHANGE MATERIAL

OBJECT OF THE INVENTION

The present invention describes a system of storage and recovery of thermal energy making use of the ability of the solid material to contain thermal energy in the form of sensible heat and of the capacity of the phase change material to contain thermal energy both in the form of sensible heat and of latent phase change. The invention described herein uses the heat from an external source or the waste heat from a process, charging a device (tank) of heat energy during a period of time established and discharging the device (tank) at a later time when the energy source is not available (or is not enough) continuously supplying thermal energy to an external system. One of the purposes of the invention is to minimize the size of the storage tank without jeopardizing the effectiveness of the same.

STATE-OF-THE-ART

The use of the thermal energy from an external source (e.g. solar energy, the residual heat of a manufacturing process, etc.) for generating electric energy or simply the use of said energy in a process (e.g. generation of steam, water heating, etc.) has become since a couple of decades an important field of study, due to the need to achieve energy conversion processes with less dependence on non-renewable resources such as fossil fuels.

The mechanisms for obtaining thermal energy have the limitation that usually they are not continuous processes. These processes only occur during a specific number of hours per day, compared to a demand that is generally continuous or simply outdated over time. That is why some means have to be employed in order to provide this demanded energy. Over recent years different ways of storing thermal energy obtained during the time that the external heat source is available and not supplying the consumer unit have been proposed. Generally, the strategy used to store thermal energy is based on the use of a heat carrier medium protected in a tank and that stores the thermal energy acquired during the hours of availability of the external source to be then used during the hours of demand by a consumer unit.

Two types of possible assemblies for the storage and the use of thermal energy acquired from an external source are those that employ two storage tanks, a hot one and a cold one, or just a single tank (thermocline), which is characterized by two delimited areas, a hot zone and a cold zone. Thermocline is defined as a layer within a fluid body where the temperature rapidly changes with the depth or the height, and where the stratification phenomenon of the fluid contained in the tank is present.

It is known that maintaining the effect of stratification within the storage heat energy tank (thermocline) during a long time, presents difficulties. This is due to the continued incorporation of fluid at the top part, or hot zone, and subtraction of cold fluid by the bottom part of the tank, to the conduction effect between layers of fluid at different temperatures and to the mixing of said layers as a result of fluid turbulence. Some strategies have been followed in order to promote stratification of the fluid in the interior of the tank. Some of them have been: a separating membrane that floats between the hot and the cold interface depending on the density of the fluid that is described in U.S. Pat. No. 4,523,629 entitled "Method and apparatus for operating an improved thermocline storage unit"; the incorporation of fixed baffles proposed in the Patent no. US2010301062, entitled "Single bi-temperature thermal storage tank for application in the solar thermal plant"; the use of mobile baffles that is proposed in the Patent no. EP2141432, entitled "Dual thermal energy storage tank"; or methods for monitoring fluid temperature at different heights of the tank as explained in the Pat. No. US20120118554, entitled "Thermal energy storage system Comprising thermocline optimal management". Each one of these patents proposes ways to avoid that the mixing of the fluid at different temperatures could favour the degradation of thermal storage system. An improvement in the design of the inlet and the outlet of the heat carrier fluid to the storage tank is proposed in the patent. No. US2012104003, entitled "Horizontal extraction and return extensions in liquid storage tanks", where it is sought to reduce the velocity of the fluid when entering or exiting the tank preventing fluid agitation and a subsequent mixing.

The heat carrier medium or the medium used to absorb thermal energy, or heat from the external source, is a fluid substance and thus dissipates the heat that is concentrated in the external heat source. Said heat carrier fluid can be, for example, water, air, or any fluid of the hydrocarbon family (thermal oils), molten salts (sodium nitrates, potassium nitrates, magnesium chloride, etc.) or a mixture of the mentioned salts. The latter must have as a special feature a low melting point that does not allow solidification of the material within the circuit during the process.

The incorporation of phase change materials (Phase Change Materials—PCM) in the systems of thermal energy storage have emerged as an alternative for improvement in that they seek to obtain a storage system with smaller dimensions. In these systems the latent heat of the phase-change material is used when it changes from solid to liquid or vice versa during the time of storage/recovering of the thermal energy. The use and application of phase change materials for high temperatures is initially disclosed in the U.S. Pat. No. 4,512,388, entitled "High-temperature direct-contact thermal energy storage using phase-change media", where it is proposed to use these kind of materials in applications for storing thermal energy at temperatures between 400-3000° F. (about 205-1650° C.). Subsequently as described in the Pat. No. US20100230075, entitled "Thermal storage system" an application where phase change material is used as a means of storage of thermal energy is described. Such material is deposited inside a tank, in which a series of heat exchangers which are the means for supplying or removing the heat to PCM are immersed. Some problems of deterioration of the efficiency of the exchangers in this type of assembly are mentioned.

The direct contact of PCM with the heat exchangers can be avoided if said material is encapsulated. A proposal based on this alternative is explained in the patent. No. US2012018116, entitled "Thermal energy storage system Comprising encapsulated phase change material," which also describes a way to perform the encapsulation process of PCM in spheres. It is mentioned how when using encapsulated PCM, a higher transfer area is obtained, which promotes the heat transfer between the medium and the PCM.

The encapsulation process of the phase change material, the PCM for high temperature applications is described in the patent No. US20110259544, entitled "Encapsulated phase change apparatus for thermal energy storage", where the technique used to make capsules of PCM in a cylindrical shape is explained. Subsequently, patent No.

US20120055661, entitled "High temperature thermal energy storage system", an innovation for encapsulating the PCM inside round pipes avoiding possible faults or breaks on the surface thereof is described. The method consists in making a series of helical grooves along the pipe containing the PCM; this facilitates the deformation of the capsule without any risk of damage as a result of the change of volume of the PCM during the melting.

PURPOSE OF THE INVENTION

The present invention aims to improve the design of a system of thermal energy storage using at least one sensible heat solid material and a group of phase change materials (PCM) having different melting points and that are properly contained. Both types of materials, the sensible heat solid material and the PCM, are in direct contact with a medium or heat carrier fluid, which is responsible of transferring to the tank (PCM and solid material) the heat coming from an external source during the charging of the system and then delivering the heat from the tank (PCM and solid material) to an external system during the discharging. It is part of the purpose of the invention to search for a device of smaller dimensions than the conventional devices without impairing the efficiency thereof, wherein efforts are be made in order to store energy efficiently.

A new design of the tank for the storage/recovery of thermal energy, which is provided of at least two zones, along the interior of the tank, duly differentiated by the filling material that contains and by the ranges of temperatures, to which they shall be subjected, are proposed. A cold zone, with a group of encapsulated PCM which are characterized by a low melting temperature or with a heat-sensible solid material is provided at one end of the tank. Then a middle zone consisting of at least one heat sensible solid material which separates the fluid in the hot zone and the cold zone will be located. The other end of the tank will contain a group of encapsulated PCM with a high melting temperature or either by the sensible heat solid material. The most common configuration is: a tank placed vertically with a bottom zone with encapsulated PCM with a low melting temperature, a middle zone with heat sensible solid material and an upper zone with PCM encapsulated with high melting temperature. Each of the described zones may be delimited by an element (mesh) that, in addition to being a structural element, prevents the PCM capsules from moving freely inside the tank.

DESCRIPTION OF THE INVENTION

A system of thermal energy storage that uses the ability of certain materials to contain energy in the form of sensible heat and latent heat of phase change is used to store during the charging and recovering during the discharging the heat from an external source (e.g. solar energy or waste heat of a manufacturing process, and that is intended to supply an external system such as: a system of electric energy generation, an absorption refrigeration system, etc.).

The system of thermal energy storage consists of a single tank or cavity containing therein a group of materials, forming a porous medium through which a heat carrier fluid can circulate. Such materials include: at least one phase change material (PCM) property encapsulated and which is responsible for storing/recovering the energy in the form of latent and sensible heat of phase or state change (solid-liquid or vice versa); at least one heat sensible solid material that will store/recover the energy in the form of sensible heat; and possibly a group of grids, meshes, or other devices, which are responsible for shaping the structure that avoids breakage due to the weight, or the escape to another area or towards the heat carrier fluid, of the materials of change of phase or the heat sensible solid material. Said tank has at least two inlets/outlets, one at one end and another one at the opposite end, where a medium or a heat carrier fluid enters and leaves the cavity or tank. The heat carrier fluid, which is in direct contact with the materials contained in the tank, is responsible for transferring the heat obtained from an external source of thermal energy to the tank or system of storage during the charging, and then transferring some of this heat to a system of external consumption during recovery or discharging.

A thermocline storage tank of thermal energy is based on the principle that a hot or hotter fluid tends to position above the layers of cold temperature or with less temperature in the same cavity. This device makes use of the phenomenon of thermal stratification of a fluid, which is a consequence of the difference in densities of the fluid depending on the temperature. Different aspects such as: the turbulence generated at the entrance or at the exit of fluid from the tank, or the convection-diffusion between the layers of the fluid, the presence of thermal bridges, can affect the stratification of the fluid, fact that reduces the efficiency of the thermal storage system described herein.

The present invention, in principle, attempts to make use of the trend effect to the positioning of the hot and the cold layers of the fluid towards the high and low zones, respectively. In effect, the entrance/exit of hot fluid as the PCM of higher melting temperature, should be located on the top part of the tank (if the tank is arranged vertically, FIGS. 1a, 1b and 1c); while the inlet/outlet of the cold fluid and the PCM lower melting point, should be located at the bottom zone. However, in specific applications where such a configuration is not possible, and considering that probably most part of the energy will be stored in the materials that are inside the tank (sensible heat solid material and PCM encapsulated) and not in the heat carrier fluid, would be possible to perform a different configuration, such as placing the tank horizontally, FIG. 1d. In the latter, the fluid would tend to mix more than in the preferred case (by the action of natural convection), but the presence of the filing materials (be it the heat sensible solid material or the PCM capsules) would tend to reduce said mixture. Also, if the dead-time between the charging and the discharging of the system is relatively small, such a mixture would not have enough time to homogenize the temperature of the materials inside the tank, which generally have a greater inertia to the heat transfer than the fluid itself (mainly the PCMs).

According to the present invention, a heat sensible solid material is positioned in the middle zone of the tank, thus delimiting or separating the hot and the cold zones of the tank. This element helps to reduce the effect of mixing between the different layers of fluid generated by the difference of temperature. Also, the solid material is in itself an element that stores energy in the form of sensible heat. The solid material can be selected from different materials, such as: a mixture of rock and sand, ceramic refractory materials, cements, quartz, Cofalite® and the like.

In the hot and the cold zones (that, preferably, will be located in the upper and lower zones of the tank, respectively) is where the groups of encapsulated phase change materials (PCM) will be located, which are responsible for storing/delivering thermal energy in the form of latent and sensible heat of phase change. The PCM(s) located in the hot zone will have high melting temperatures, while the PCM(s)

of the cold zone will have low melting temperatures within the range of the operating temperatures of the system, in both cases.

A PCM configuration at one end of the tank, filling the rest with sensible heat solid material is expected, within the invention. In this case we would have only two different zones: a hot zone (or cold) with PCM with high melting temperature (or low) and another area of medium/cold (or medium/hot) with sensible heat solid material.

If necessary, the different zones may be delimited by meshes or grids confined within the fillers, preventing the escape thereof to other zones or outside the tank with heat carrier fluid, and/or serving as a structure to prevent its damage due to the weight they would support in case they would not be included.

The way the system of thermal energy storage captures and maintains the heat is making use of the sensible and latent heat of phase change of the PCM, and the sensible heat of the solid material during the charging. This charging is performed after the heat carrier fluid making contact with the external energy supply and it will transfer some of its energy. The heat carrier fluid that is hot flows through the circuit and feeds the tank by one end, making direct contact with the capsules of phase change material of higher melting point. Part of the energy contained in the hot fluid is transferred to the PCM capsules, and the change of solid-liquid phase takes place. Meanwhile, the heat carrier fluid continues its itinerary bathing the sensible heat solid material and transferring to it part of the energy left, which will store in the form of sensible energy. Then, the fluid continues flowing and goes through the cold zone of the tank. Here you find the PCM capsules of lower melting point, to which the fluid will deliver the rest of its energy, producing the phase change of the PCM contained in said capsules. The cold heat carrier fluid is conducted back to the external energy source to be heated and to continue the cycle of the system. FIG. 2 shows a diagram, as an example, of the system of thermal energy storage together with external energy supply, working during the discharging step. The system that demands energy or consumption external unit is also show. It can be seen that while the external consumption unit is working, the storage system is being charged and the two situations happen simultaneously.

The storage system discharging, or recovery phase of the thermal energy stored in the tank, happens when the source of external energy is not available or is insufficient to satisfy the demand and requires a supply of thermal energy in order to continue its operation. One possible scheme is the one shown in FIG. 3. During this stage, the system returns part of the energy stored—in the form of sensible and latent heat of phase change of the PCM (the portion of sensible energy stored in the PCM can very noticeable), and of sensible heat of the solid material- to the heat carrier fluid. The heat or thermal energy transferred to the heat carrier fluid in the storage tank is delivered to the unit of external consumption. There, the thermal energy is used (e.g. for generating water vapour which is then conducted to a turbine connected to an electricity generation system). The heat carrier fluid that exits the external consumption unit is returned by the thermocline tank circuit and feeds it by the bottom thereof, feeding back the cold zone of the tank.

At least one PCM of the ones included in each zone must be chosen so that its melting temperature is comprised within the permissible range of fluid temperatures for the process in which the energy storage tank will be used. That is, in a tank where PCM is placed in the hot zone, said PCM must have a phase change temperature that is within the permissible range of fluid temperatures for feeding the external energy storage system. At least one PCM of the cold zone must be chosen so that its melting point is found within the permissible range of fluid temperatures for returning to the energy source. Thus, it is achieved that, while the PCM located at the fluid outlet—for example, during the discharging, the PCM of the hot area—is phase changing, the heat carrier fluid exits with a temperature close to the melting point of the PCM in question; and therefore at an acceptable temperature for the external energy consumption device. That is, the location of PCM at the ends in this way prolongs the time of operation of the storage system to acceptable levels of temperature for the process in which it will be included.

The phase change material (PCM) can be encapsulated into capsules with different geometrical shapes (e.g. cylindrical, spherical, toric, etc.) or simply into hollow plates. Said capsule is a housing that can be made of different materials; some of them are listed next: Carbon steel, stainless steel, aluminium, nickel or Inconel, titanium, among others, depending on the operating conditions of the system. The capsule is characterized by having a free space on the inside, which is partially filled by general phase change material. Within the phase change materials you can find paraffins, inorganic salts, metals, among others. Some of the phase change materials for high temperature are listed below: Zn, AlSi, NaK, $NaNO_3$ $KNO_3$, $NaNO_2$—$KNO_3$, $MgCl_2$.NaC, $MgCl_2$.KCL, NaCl—KCl, and combinations thereof, each one are used depending on the required working temperature of the system. An important feature of the capsule which confines the PCM, if it is rigid, is the importance of having an empty space to enable the expansion of the PCM contained therein during the solid-liquid phase change. If this space is not considered, possible damages to the structure of the capsule may occur throughout the useful life of the system.

In the case of thermal storage systems of high temperature, the heat carrier fluid employed is generally a molten salt, a mixture of molten salts or alkali metal. The main feature of this element is that it must be in the liquid state during the runtime of the system, as it has to continuously flow throughout the circuit and it's the one in charge of transferring thermal energy from the external source to the tank, and then from the tank to the external consumption unit. Thus, the heat carrier fluid should generally have a temperature or a low melting point, which ensures that it will remain in the liquid state.

Regarding the manufacturing process of the PCM capsules, this patent does not directly influence on the different mechanisms of manufacturing these elements, nor on a specific invention for manufacturing them, as the purpose of this patent is able to describe an invention capable to store and recover thermal energy over a period of time, using heat sensible materials and phase change materials. However, the technical literature (existing patents), have been reviewed, and different alternatives or methods of manufacture of capsules in order to contain the PCM have been found. Capsules with different geometric configurations have been previously mentioned, the objective is to use capsules with a bigger surface, which favours the heat transfer. The first alternative for obtaining capsules consists in using the technique of successive coatings on a mass or volume of phase change material on several layers of different materials. The starting point is a mass or volume of phase change material (e.g. sodium nitrate, potassium nitrate, inorganic salts or mixture thereof) with the desired geometric configuration, which is covered by a second material that thus conforms the housing of the first (e.g. material based on organic polymers such as: hydroxypropylmethyl cellulose, carboxymethyl cellulose, ethyl cellulose, polyethylene, polyvinyl chloride and the like). A new coating with a third material (e.g. a metal such as: nickel, carbon steel or stainless steel), with the characteristic of having a higher melting temperature than the second material, is deposited over the first housing. The resulting capsule is subjected to heat in an oven, wherein the layer generated by the second material evaporates, leaving an empty space within the capsule, this space will be occupied by the PCM in the expansion that takes place during the process of solid-liquid phase change of the PCM. Finally, the capsule is subjected to a new coating with a fourth material (e.g. a metal such as: nickel, carbon steel or stainless steel, which can be the same material of the third layer), which configures the final casing of the capsule that contains the PCM inside, this last layer must have the characteristic of creating an impervious surface that does not allow leakage or loss of PCM during the fusion process thereof. The second alternative is to coat the mass or volume of PCM with a composite material forming a first casing; said composite material is the mixture of particles of a metal and a polymer (e.g. sodium chloride with metal particles, a polymer with metal particles, a mixture of clay with metal particles and the like). The resulting capsule is subjected to a second coating with a second material (e.g. a metal such as: nickel, carbon steel or stainless steel), then the capsule is subjected to heat in an oven where the composite material is sintered, giving as a result that the metal particles conform a metal coating and the other material (usually a polymer) disappears, leaving free space for the PCM to expand during the phase change. Finally, a new coating of a third material (e.g. a metal such as: nickel, carbon steel or stainless steel, which can be the same of the second layer) is performed by conforming the final casing of the capsule containing the PCM, said housing should be impervious and with a higher melting point than the PCM. A third alternative consists in using the technique of electrodeposition of metals over the phase change material, in which by means of a self-catalytic reaction a metal, such as nickel, is deposited over the PCM obtaining a nickel casing, there is the restriction in this case the that the PCM must be a metal, such as zinc. In the latter technique, to leave free space for the expansion of PCM, is not sure, which can result in damages to the capsules throughout the cycles of use of the system. The last alternative described for encapsulating the PCM, without restricting the use of other methods of manufacturing encapsulates, it is in principle simpler and causes less problems when defining the free space necessary for the expansion of the PCM. The housing containing the PCM is constructed from a piece of tubing (e.g. of cylindrical section), one end is sealed and the other one is left free for the posterior partial or complete filling of the PCM, then this end is sealed by a lid which is welded to the pipe, obtaining a capsule with PCM inside. The above techniques of making encapsulated PCM have been described in previous patents that have been properly referenced in the Prior Art section.

As noted at the beginning of this section, in the interior of the thermocline or storage tank there are a number of materials: PCM, sensible heat solid material, heat carrier fluid, and possibly grids or meshes of contention. The choice of said materials, the dimensioning of each of the areas described, the amount of each of the materials (mass or volume of material), the size of the capsules (diameter, height, length, thickness, etc.), the size of the tank, the thickness of the insulating walls, among other aspects, must be established from the working conditions and regimes of operation of the system of thermal energy storage. In order to establish the dimensions of the proposed invention of this patent, a numerical simulation method is used, which makes use of a mathematical model to establish the thermal and fluid-dynamic behaviour of the system of thermal energy storage. The mathematical model consists of a system, of governing equations, which has been obtained from the principles of conservation of mass, lineal momentum and energy. Said model, conforms a system of equations that is solved by numerical methods. The solution of the model results in a prediction of the operation of the system, which is used as a criteria for the dimensioning of the invention described in this patent. Further details and characteristics will be made clear during the description of the invention in which illustrative, but not limitative, different aspects of the invention, with the help of corresponding figures are indicated.

The following is a list of the different component parts of the invention and which are identified in the section that follows (Description of the figures) with the help of numbers: (1) system of thermal energy storage, (2) storage tank or thermocline, (4) hot zone, (5) cold zone, (6) middle zone, (7) meshes or grids, (8) heat sensible solid material, (9) capsules of encapsulated PCM (10) heat carrier fluid. (11) feeding outlet or drain tank located at the top part of the tank (12) feeding outlet or drain tank located in the bottom part of the tank (17) external heat source (e.g. solar collector, with respect to the storage system in a thermal energy plant of CSP or a system of refrigeration by absorption), and (18) external consumption unit.

DESCRIPTION OF THE FIGURES

To complement the description of the invention described herein and for a better understanding of the features that make it distinct, the present specification incorporates a group of related figures listed below.

DESCRIPTION OF PREFERRED EMBODIMENTS OF THE INVENTION

Figure 1A:
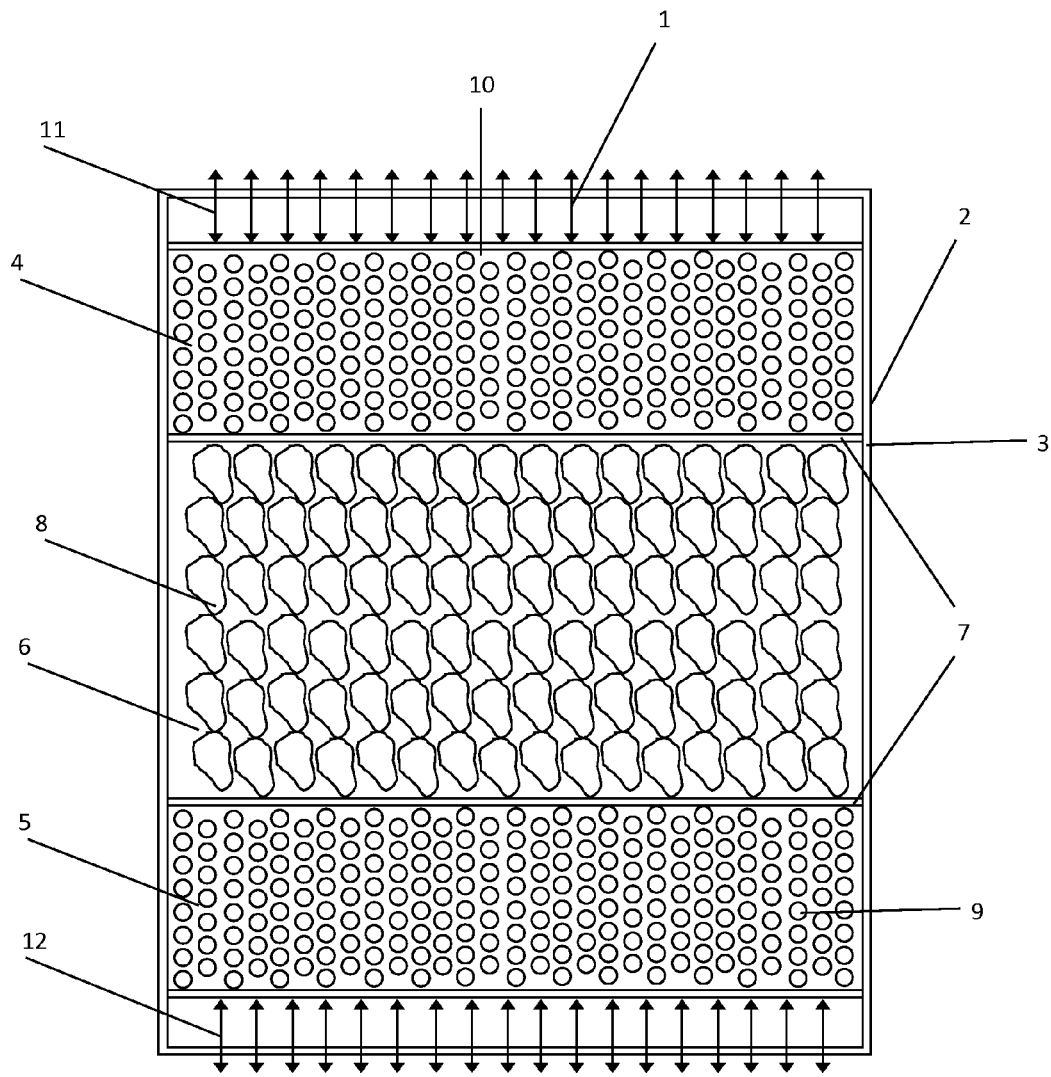
FIG. 1*a* is a schematic representation of the system of thermal energy storage based on sensible and latent heat of phase change. In this figure the different zones that take place in the interior of the tank, the hot zone (4), the cold zone (5) and the middle zone (6), are represented as a preferred configuration. In each of the zones a volume of different materials is contained, PCM encapsulated (9) and sensible heat solid material (8) which are delimited by some structures, grids or meshes (7), acting as a support and preventing the sudden movement (or leakage) of the volumes of different material inside the tank.

One of the preferred embodiments of the present invention corresponds to a system of storage of thermal energy based on the stored energy in the form of sensible and latent heat of phase change of the PCM and of the sensible heat of a solid material found in the inside a tank. Said materials are distributed in three clearly defined zones. Initially the thermal energy from an external source (e.g. solar energy, waste heat from industrial processes, etc.) is stored, and is then recovered and used by an energy consumption unit that demands it during a period of time where there is no external energy source (e.g. overnight in the case of using solar energy), or when the same is not enough.

FIG. 1 shows schematically the system of thermal energy storage (1), comprised by tank or cavity (2) in which a series of materials that are used as heat storage medium are contained. These materials correspond to:

A group of capsules (9) that contain therein a phase change material, said material is characterized by a changing state (solid-liquid or vice versa) depending on the temperature at which the capsules are subjected. At least two phase change materials are used in the disclosed invention: A phase change material with a temperature or a high melting point that is encapsulated within a group of capsules, which is contained in the superior part of the tank, conforming the hot zone (4); and a second phase change material with a temperature or a low melting point that is encapsulated within a group of capsules, which is contained in the bottom part of the tank, conforming the cold zone (5).

A sensible heat solid material (8) which is located in the central zone (6) of the tank.

A series of grids or meshes (7) that could be used, if necessary, with the function of binding each of one the materials described above, conforming a rigid structure that would prevent the sudden movement of the capsules (9) and the leakage of the heat sensible solid material (8) of de interior of the tank (2).

A medium or heat carrier fluid (10) that circulates around the whole circuit of the installation and that is the means of transport of the thermal energy, between the external heat source, the storage tank and the external consumption unit. This fluid enters and exits the tank, bathing and exchanging heat with each one of the described materials: PCM capsules (9), sensible heat solid material (8) and grids (7), at different temperatures depending on the position (height) of the tank.

The tank (2) is characterized by having two inlets that allow the access or exit of the heat transfer fluid (10), an inlet (11) located at the top and another inlet (12) located at the bottom of the tank. The design of the inlets, in principle, would seek to homogenize the flow throughout the tank section; however, this will depend on the particular application and the design limitations. To avoid excessive heat loss, the tank (2) is thermally insulated from the outside by insulating material (3) that covers the walls and the top and bottom covers of the tank.

Figure 2:
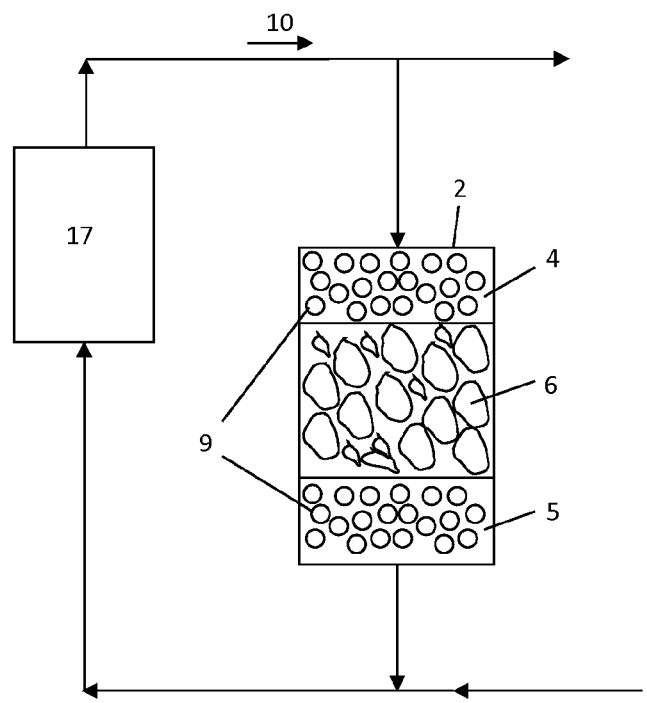
FIG. 2 is a schematic representation of the system of thermal energy storage coupled to the external heat unit (heat source) (17). In this case the system is working during the charging or the energy storing process.

The system of thermal energy storage operates in two stages, the first stage is the charge of the system, which occurs when the external source supplies heat (e.g. during the hours of the day when there is no solar radiation, in the case of a system based on solar energy); and the second stage corresponds to the discharging or recovery of the heat previously stored. This last stage takes place when the external heat source is not available or when it is not enough, and the external consumption unit demands or requires energy for its full operation. The coupling of the thermal energy storage system wherein the heat sensible material is combined with phase change material to a unit or external heat source and to an external consumption unit is shown in the FIGS. 2 and 3, where each one of the stages operating the system are schematically shown.

During the charging or the storing stage, the heat carrier fluid (10) exchanges heat with the external heat source (17), where the heat from the external source is transferred to the heat carrier fluid. The heat carrier fluid (10) flows, circulating through the circuit shown in FIG. 2, in two directions: the first one corresponds directly to the system or external consumption unit (18) where the heat is required in order to complete a process (e.g. generating water vapour which is required in a turbine-generator system in order to produce electricity); and the second path that follows the heat carrier fluid goes to the storage tank (2). The heat carrier fluid entry is made by the top part of the tank, entering the hot zone (4), bathing and exchanging heat with the group of PCM capsules due to heat flow from the heat carrier fluid (10) to the capsules (9), the phase change material increases its temperature and when it reaches its melting point, the material changes state (solid-liquid) thus achieving to store in the form of latent heat of fusion a great part of the thermal energy transferred from the heat carrier fluid. The heat carrier fluid continues to flow in the interior of the tank (2) until it reaches the heat-sensible solid material (8), with who also exchanges heat and who stores in the form of sensible heat a part of the heat transferred from the heat carrier fluid. Finally, the heat carrier fluid reaches the cold zone (5) of the tank, where it continues exchanging heat with PCM capsules before exiting the tank and starting a new cycle.

Figure 3:
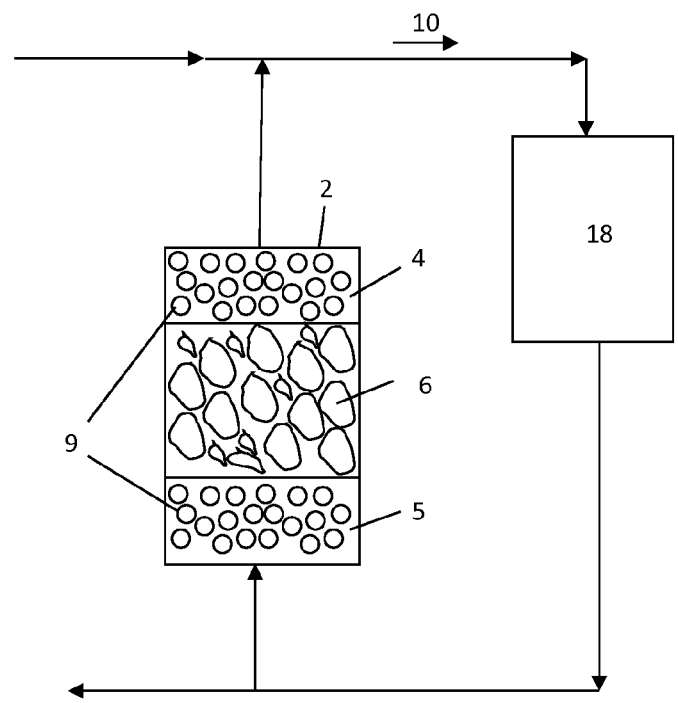
FIG. 3 is a schematic representation of the system of thermal energy storage coupled to an energy consumer unit (18) that demands energy in the stage that there is no external heat source, its operation is shown during the process of discharging/recovering of energy.

During the discharging or recovery phase, FIG. 3, the heat carrier fluid (10) exchanges heat with the external consumer unit (18), where the heat is used to complete a process (e.g. generate water vapour). When leaving the heat carrier fluid (10) of the external heat consumption unit, this fluid flows until returning with a lower energy level of energy to the tank (2). The entry of the heat carrier fluid to the tank is at the bottom part, feeding the cold area (5) of the tank.

The invention contemplates the use of a mathematical model, used to predict the size of the tank, the dimensions and the number of capsules (9) that are contained in the hot zone (4), and in the cold zone (5); also it is used to estimate the amount of each one of the materials included in the thermocline tank (2).

Figure 1B:
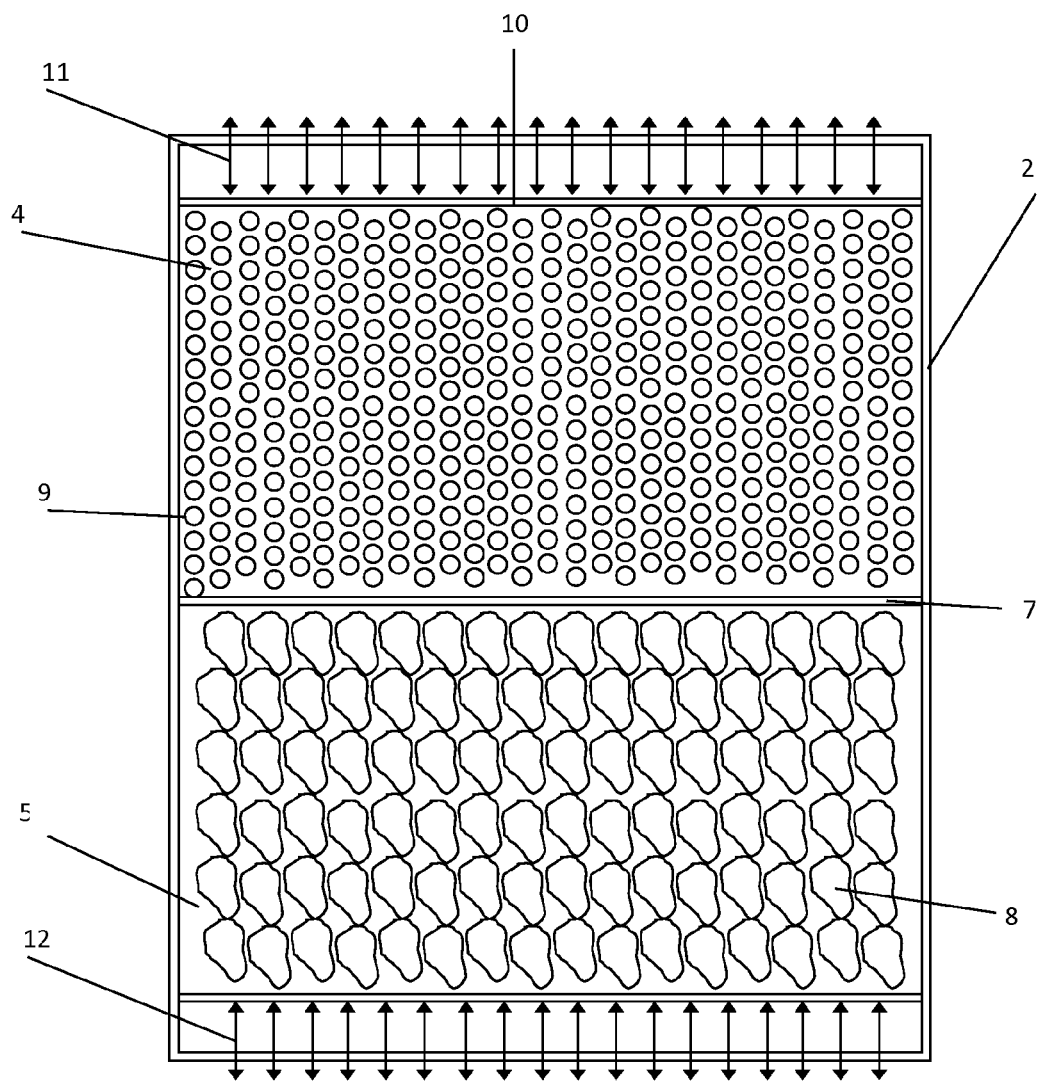
FIG. 1*b* is a schematic representation of the system of thermal energy storage based on sensible and latent heat of phase change. In this figure the different zones that take place in the interior of the tank, the hot zone (4) and the medium/cold zone (5), are represented as one of the possible configurations which may take place. A zone is composed of PCM encapsulated (9) and the other one by sensible heat solid material (8) which are delimited by some structures, grids or meshes (7), acting as a support and preventing the sudden movement (or leakage) of the volumes of different material inside the tank. It's possible to have the PCM encapsulated (9) above the hot zone (with high melting temperature, within the operating range of the system) and the sensible heat solid material (8) down in the cold zone, or using a PCM with a low melting point (within the operating range) for the cold zone and solid material for the medium/hot zone. The final design will depend on the application, operating conditions, and other factors.

A second preferred embodiment of the system of thermal energy storage corresponds to a tank (11) allowing the access or the exit of the heat carrier fluid (15), an inlet (17) located at the top part and another inlet (18) located in the bottom part of the tank. Said tank is divided in two zones only, a hot zone (4) and a medium/cold zone (5). A scheme is shown in FIG. 1b. In this preferred embodiment a group of PCM capsules (9) that will fill one of the zones and a heat sensible solid material (8) will fill the other area are used.

A variation to the second preferred embodiment is one in which a PCM (9) of low melting point is located in the cold zone (5), while the medium/hot zone (4) contains the sensible heat solid material (8).

Figure 1C:
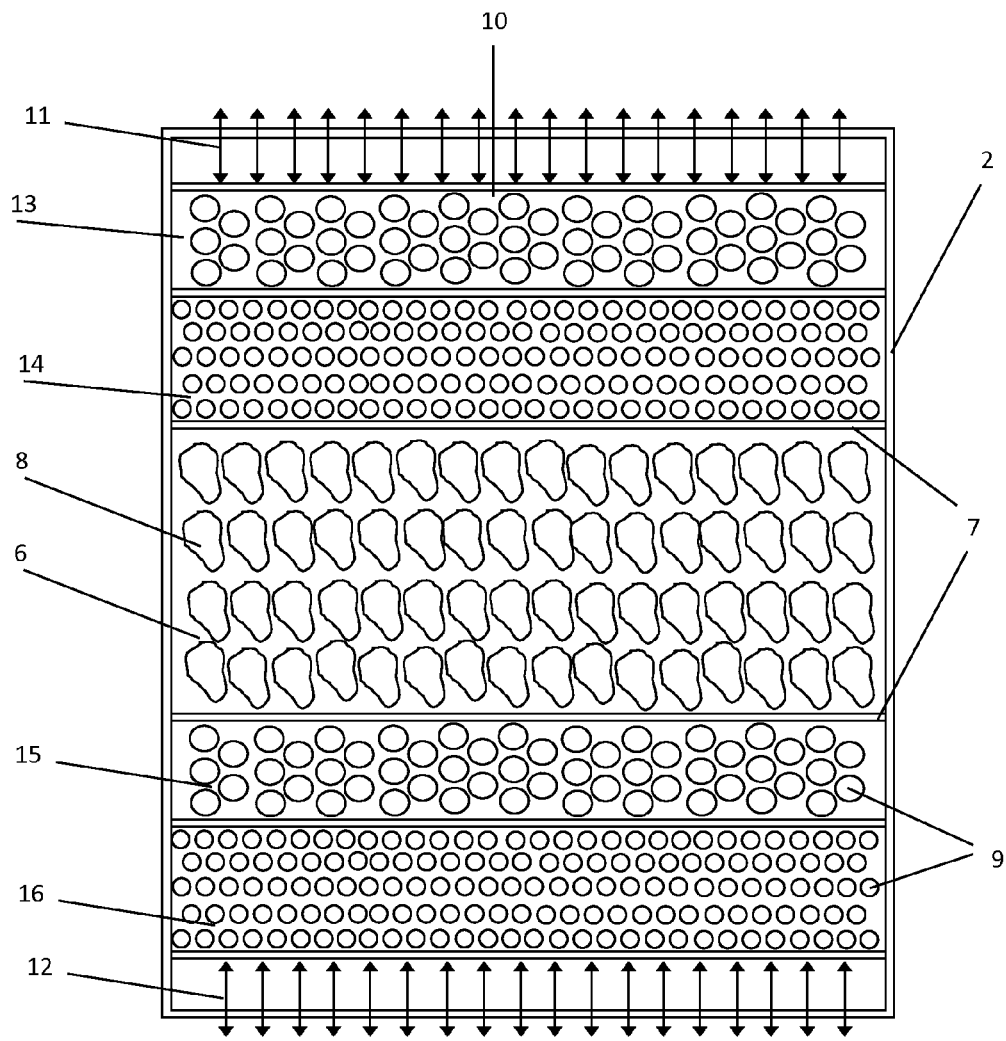
FIG. 1c is a schematic representation of the system of thermal energy storage based on sensible and latent heat of phase change. In this figure the different zones that take place in the interior of the tank, the hot zone divided into two sub-zones (13) and (14), the cold zone divided into two sub-zones (15) and (16), and a middle area (6), are represented as another possible configuration. Each one of the zones is filled with different materials, PCM encapsulated (9) and sensible heat solid material (8) which are delimited by some structures, grids or meshes (7), acting as a support and preventing the sudden movement (or leakage) of the volumes of different material inside the tank. Two types of PCM, each one with different melting temperatures, fill the hot zone, thus configuring two sub-zones; in the same way two PCM of different melting points fill the cold zone.
Figure 1D:
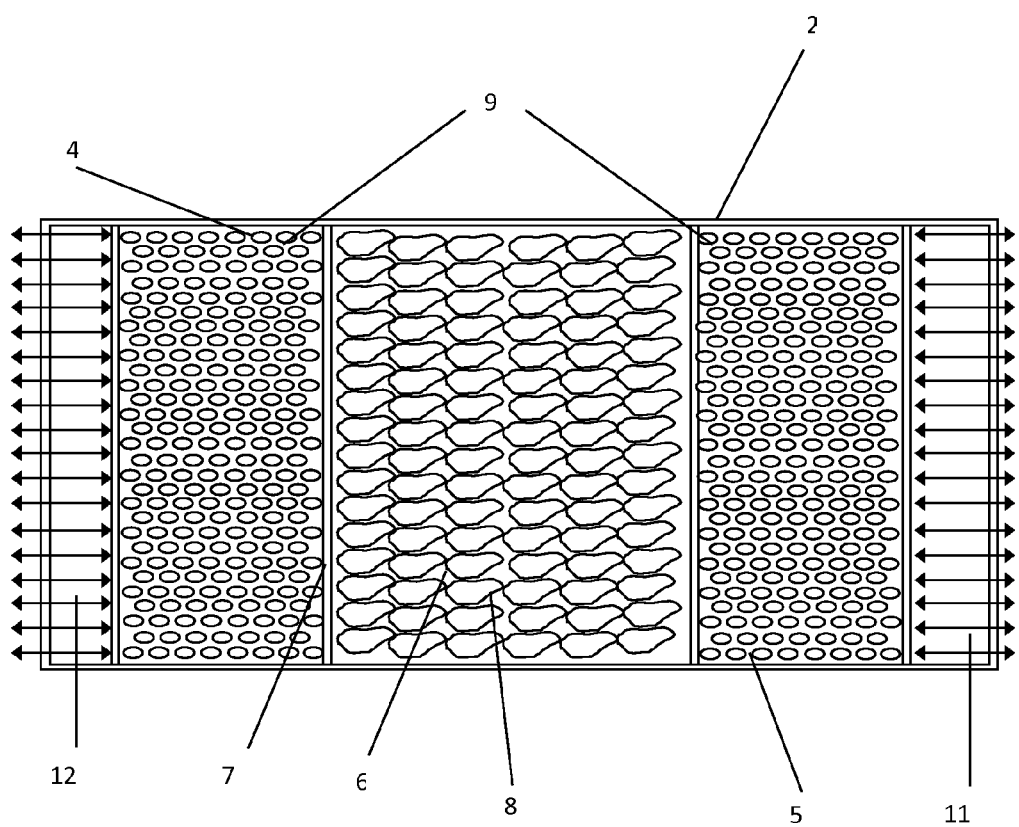
FIG. 1d is a schematic representation of the system of thermal energy storage based on sensible and latent heat of phase change. In this figure the different zones that take place in the interior of the tank, the hot zone (4), the cold zone (5) and the middle zone (6), are represented in a tank which is arranged horizontally. A volume of different materials, PCM encapsulated (9) and sensible heat solid material (8), which are delimited by some structures, grids or meshes (7), acting as a support and preventing the sudden movement (or leakage) of the volumes of different material inside the tank, is contained in each of the zones.

A third preferred embodiment of the system of thermal energy storage corresponds to a tank (2) which is delimited on three areas, a hot zone, divided into two sub-regions (13) and (14), a cold zone, divided into two sub-areas (15) and (16), and a medium zone (6), a scheme is shown in FIG. 1c. In this preferred embodiment different groups of PCM capsules (9) are used, each group of capsules is characterized by having different melting temperatures. The groups of capsules (9) will fill each one of the sub-areas and a heat sensible solid material (8) will fill the middle zone. The order of filling of the tank with the different materials depends on the temperature, so the PCM capsules with lower melting temperature will be located at the bottom part of the tank or cold zone (16) followed by a second group of capsules of PCM with a temperature higher than the previous one but lower than the two other groups of capsules of PCM (15), then the heat sensible solid material (8) is located, then the two groups of capsules of PCM will be placed in the sub-zones (14) and (13), taking care of placing the group with higher melting temperature at the highest part of the tank. It is possible that the inclusion of grids or screens delimiting each area and sub-area would be necessary, in order to prevent the movement and the possible mixing of the capsules, besides preventing the loss or leakage of the solid material from the storage tank.

A fourth preferred embodiment of the system of thermal energy storage corresponds to a tank (2) which is disposed horizontally, in comparison to the preferred embodiments described above, a scheme is shown in FIG. 1d. Said tank is divided in three zones: a hot zone (4), a cold zone (5) and a middle zone (6), and each zone is filled with different materials, such as PCM encapsulated (9) and sensible heat solid material (8). The application of this preferred embodiment will depend on the operating conditions, such as: time and temperatures of charging and discharging.

Illustrative Examples

The following illustrative examples show the results obtained in two applications of the invention described herein.

The main features of the related application are described first, and then the possible designs and different results are described.

Characteristics of the selected illustrative example: An industrial process that is required to store thermal energy for a few hours, before being used in the following hours is considered.

The process of accumulation of energy in the system is called of "charging", while the energy extraction is called of "discharging". Temperature limits (set-point temperatures) for both processes, which should not be exceeded, are further specified. That is, for the charging process, wherein a hot fluid enters the system and cold fluid exits the system, a maximum output temperature not to be exceeded is specified. Similarly, for the discharging process, in which a cold fluid enters the system and a hot fluid exits the system, a minimum output temperature is specified. These are usual restrictions that response to the requirements of the industrial processes be it for efficiency reasons or for safety of the equipments to which the storage system is connected.

As fixed parameters are considered:

Fluid input temperatures in both processes (charging and discharging). They will be designated as $T_{max}$ and $T_{min}$ respectively.

Mass flow of fluid in both processes. In this case they will be considered as equal.

Heat transfer fluid properties.

Dimensions of the storage tank.

Temperature set-points of both processes. The ones corresponding to the charging and the discharging will be designated as and, respectively. Additionally, the temperature intervals considered as "acceptable" in both processes are of the 15% of the total range of temperatures. That is, the difference between the input temperature of the charging process (maximum working temperature, and therefore, maximum outlet temperature in the discharging) and the set-point temperature of the discharging process (minimum outflow temperature) will equal the difference between the inlet temperature in the discharging and the set-point temperature in the charging process. This can also be written as follows:

Results of numerical simulations of a storage system that uses a single solid filler material (sensible heat), and others in which hot and cold PCM layers are included, are compared.

Assuming that phase change materials melt at a fixed temperature, the melting points of at least two groups of PCM, are chosen within the ranges of admissible temperatures. That is to say:

The question here is to dimension each layer, so that an optimal utilization (global and individual) is reached, that is, to achieve that the maximum possible amount of PCM to change phase, and the maximum possible amount of solid material to undergo a change of temperature as high as possible between consecutive charging and discharging processes. Additionally—since generally the accumulation of sensible energy in the PCM it is not negligible-it is also desirable that most of the PCM undergoes the highest possible temperature jump.

Simulations:

The method used to simulate the thermal behaviour of the storage system is the numerical simulation of the governing equations. The balance equations of mass and energy are simplified using reasonable assumptions and several simulations have been made, using the same material of sensible energy storage, and varying the configuration and the temperatures of melting points of the PCM in both ends. The results obtained with a system in which only filling (not PCM) material is used and another one in which a single phase change material is used throughout the tank, whose melting point is among the set-point temperatures, are compared, that is:

Thermo-physical properties of the different materials that form the system have been taken from the literature of the state-of-art.

Also, it is assumed that the phase change materials is encapsulated in spheres, forming a packed bed with a fraction ( ) of 34%; whereas the sensible heat solid material leaves a void fraction of 22%, assuming that it is comprised of particles with different diameters, resulting in a higher compactness compared to the case of spherical capsules of the same diameter.

Simulations of several consecutive processes of charging and discharging processes are performed until a balance is reached, in which all the energy stored in the charging process is recovered in the following discharging process (periodic equilibrium state). Therefore, the idle (or standby) periods between processes, in which part of the energy is lost and the stratification deteriorates, is not taken into account. However, the results obtained are useful in the sense of corresponding to the maximum amount of stored/recovered energy in the periodic equilibrium state after several passes. Also, these obtained results do not depend on the conditions assumed at the beginning of the simulations, which greatly affect the results of the first cycles.

Results:

Four different situations about the illustrative example described above, named case A, B, C1 and C2, are studied. Cases A and B are taken as the standard reference, whereas the cases C1 and C2 incorporate own criteria of this invention.

Case A: tank completely full of sensible heat solid material (not PCM).

Case B: Tank completely full of PCM of reference. Its melting temperature is set at the 60% range of operating temperatures; i.e.

Said temperature is not within the admissible outflow temperature ranges of neither of both processes C1 Case: Hybrid tank type, using two PCM, with a 20% of the height covered by PCM1, 60% by sensible heat solid material and the remaining 20% by PCM2. The melting points of the two PCM are:

The phase change temperatures of both PCM are within the admissible range of temperatures of the corresponding processes:

Case C2: Hybrid tank type, using four PCM, with a 15% of PCM1, a 15% of PCM3, a 40% of sensible heat solid material, a 15% of PCM4 and a 15% of PCM2. The melting temperatures of the other two PCM are:

The phase change temperatures of the new PCM (PCM3 and PCM4) are not in the admissible range of temperature of any of the processes:

The results of the simulations are as follows:

| RESULTS | A | B | C1 | C2 |
|---|---|---|---|---|
| Storage time | 1.0 | 0.81 | 2.20 | 2.26 |
| Energy stored by the PCM + solid material | 1.0 | 0.71 | 2.16 | 2.31 |
| Total energy stored | 1.17 | 0.95 | 2.89 | 2.97 |
| (Energy stored by the PCM + solid material)/(Maximum storable energy by the PCM + solid material) | 43.5% | 15.8% | 67.9% | 63.7% |
| (Total energy stored)/(Maximum storable energy) | 43.7% | 19.1% | 68.1% | 62.1% |

The above table shows the results of:

Storage time: It is the time of operation of the device, before reaching the set-point temperature. It is expressed relative to the case A; that is, case B has an operating time of 81% with respect to that of case A.

A single value has been indicated because the resulting time for the charging and discharging processes is almost the same, given the assumptions made. A higher storage time is a good indicator of a higher amount of energy stored (or delivered), as the outlet temperature (in both processes) does not change much for the different cases, due to having relatively narrow admissible temperature range.

Energy stored by the PCM+solid material: It is the amount of stored energy d in the charging process (or delivered in the discharging process) in the PCM and in the solid material. As with the operating time, this value has been expressed as relative to the value of case A.

Total energy stored: The total stored energy (or delivered) by the thermal energy storage system. It includes the energy stored in PCM+solid material and the stored energy in the heat carrier fluid which remains in the tank after each process. This value is expressed relative to of the heat stored in PCM+solid material of case A. That is, the total energy stored in the case A is 17% bigger than the energy stored in PCM+solid material of the same case; while in the C1 case, the total energy stored equals 2.89 times the stored energy in case A by the PCM+solid fillers.

(Energy stored by the PCM+solid material)/(Maximum storable energy in the PCM+solid material): It is equivalent to the ratio between the values of energy stored in PCM+solid material and the energy that could be stored if the whole capacity (sensible and latent) of the filler material were used. In other words, this value intends to express a measure of efficiency of the use of all the filler material contained in the tank (PCM+ sensible material).

(Total energy stored)/(Maximum storable energy): It is equivalent to the ratio between the values of stored energy in total and the energy that could be stored if the whole capacity of all the materials within the tank were used. The difference with the previous value is due to the inclusion of the stored and storable energy in the heat transfer fluid confined in the tank. This value tries to express a measure of efficiency in the use of all the material contained in the tank.

It can be observed that the worst results have been obtained in the case B, that is, with the accumulation tank fully filled with a PCM whose melting temperature is not within the admissible range of any of the processes (charging or discharging). The case A, is the next one in terms of worst results, whereas cases C1 and C2, corresponding to hybrid tanks, show the best results. The case using four PCM shows slightly better results than the one including only two; however, the efficiency in the use of the storage material in the former is lower than in the latter.

We must indicate that the compositions considered in the cases C1 and C2 are not necessarily optimal (using the same filler materials and varying the height of the tank that each one occupies) in terms of stored energy results; and that said results significantly vary with the modification of the amount included of each material, being necessary to perform a careful study in order to obtain said optimal (taking also into account the criteria of efficiency and costs). The cases C1 and C2 described here have been chosen among the best, obtained after performing several tests, and only with the intention to present the possibilities of the invention in an illustrative way.

Each one of the preferred embodiments of the system thermal of energy storage described in this section and throughout this document, can be coupled to a heat generating system (e.g. waste heat of a manufacturing process), in order to store it for a period of time (time during which the residual heat is produced) and to subsequently recover and deliver it to the same system or to a second system that requires or uses heat for performing a process over a period of time which does not correspond (or partially corresponds) with the storage. This preferred type of embodiments do not necessarily need to operate at high temperatures, as in the case of the electricity generation that uses solar radiation energy as an energy source that has been being used as an example.

Having the nature of the present invention been sufficiently described, as well as the way of implementing it, it is not considered necessary to extend the description so that any one skilled in the art could understand the scope and advantages of the invention. It is noted that, in essence, it could be accomplished in other embodiments which differ in detail from the one indicated as an example, and which are also will reach the protection that is always sought, provided that it is not altered, changed or modified in its fundamental principle.

The invention claimed is:

1. A thermal energy storage system combining sensible heat solid material and encapsulated phase change material, comprising:
    a storage tank containing heat sensible solid material and capsules of encapsulated phase change material in direct contact with a heat carrier fluid, the tank being configured and arranged to store, during charging of the system, thermal energy obtained from an external heat source over a period of time and then, during a discharging of the system, to recover some of the discharged thermal energy and carrying it the recovered thermal energy towards an external consumption unit, wherein the storage tank has two opposed ends, each of said opposed ends including at least one inlet/outlet, by means of which during said charging of the system the heat carrier fluid enters in a hot zone and leaves the tank through a cold zone;
    at least one group of encapsulated phase change materials; located in said hot zone and having a high melting temperature within an admissible range of the fluid temperatures for feeding said external consumption unit and prolong the time of operation of the storage system; and
    at least one heat sensible solid material which is located:
    a) in a middle zone of the storage tank that separates at least two groups of encapsulated phase change materials, a first one that is the one located in said hot zone and second one located in said cold zone and having a low melting temperature within a permissible working range of fluid temperatures for returning to the external consumption unit during the discharging of the system; or
    b) in said cold zone.

2. The thermal energy storage system according to claim 1, wherein the properties of the heat sensible solid materials and encapsulated phase change materials are configured to capture and store the thermal energy that is produced in an external heat unit in a first charging step, and then recover and deliver said stored thermal energy to a second external consumption unit in the second discharging step.

3. The thermal energy storage system according to claim 1, comprising a phase change material that is encapsulated into capsules or shells or simply into hollow plates of impervious material resistant to wear and corrosion, preventing the phase change material from getting in direct contact with the heat carrier fluid, which could degrade the phase change material.

4. The thermal energy storage system according to claim 1, wherein said storage tank is arranged vertically and has a side wall and two lids, an upper one and a lower one, each one being thermally insulated by means of an insulating material.

5. The thermal energy storage system according to claim 1, wherein at least one group of phase change materials, which are selected from: inorganic salts and/or eutectic mixtures thereof including sodium nitrate, potassium nitrate, manganese chloride; different types of metals or metal alloys including zinc or nickel-zinc; different types of paraffin's; or any other suitable material for the working range of temperatures.

6. The thermal energy storage system according to claim 5, comprising two groups of different encapsulated phase change material with different properties, all depending on the temperatures or melting points of the working or operating temperature of the thermal energy storage system and of the temperature of the cold zone and the hot zone of the tank.

7. The thermal energy storage according to claim 1, wherein in said group of capsules of encapsulated phase change material located at the hot zone, the capsules having as a primary characteristic a temperature or melting point much higher than the one of the phase changing material located at the cold zone and being impervious preventing the leakage of the phase changing material.

8. The thermal energy storage system according to claim 1, wherein the tank is arranged vertically and comprises at least one inlet for the access or exit of the heat carrier fluid from the hot zone of the tank that is located in the top part.

9. The thermal energy storage system according to claim 1, wherein the tank is arranged vertically, comprising at least one inlet for the access or exit of the heat carrier fluid from the cold zone of the tank, said access or exit being located in the bottom part.

10. The thermal energy storage system according to claim 1, wherein the tank is arranged horizontally, the hot zone being located in one side of the tank and the cold zone in the opposite side.

* * * * *